(12) United States Patent
Higuchi et al.

(10) Patent No.: US 7,068,305 B2
(45) Date of Patent: Jun. 27, 2006

(54) INTEGRATED IMAGING AND PRINTING APPARATUS

(75) Inventors: Yoshinari Higuchi, Tokyo (JP); Seiichi Morikawa, Kanagawa (JP); Hajime Ishimitsu, Saitama (JP); Koichi Sakata, Tokyo (JP); Junya Ishihara, Aichi (JP)

(73) Assignee: Sony Corporation, Tokyo (JP)

( * ) Notice: Subject to any disclaimer, the term of this patent is extended or adjusted under 35 U.S.C. 154(b) by 805 days.

(21) Appl. No.: 09/799,981

(22) Filed: Mar. 6, 2001

(65) Prior Publication Data

US 2001/0030691 A1 Oct. 18, 2001

(30) Foreign Application Priority Data

Mar. 7, 2000 (JP) ............................. 2000-061743

(51) Int. Cl.
*H04N 5/225* (2006.01)
(52) U.S. Cl. ..................................... 348/207.2; 348/372
(58) Field of Classification Search ................ 358/406, 358/1.14; 347/2, 3, 61, 190; 348/207.2, 348/207.99, 333.02, 333.04, 333.13, 372; 320/106, 150, 132; 700/297; 713/340
See application file for complete search history.

(56) References Cited

U.S. PATENT DOCUMENTS

| | | | |
|---|---|---|---|
| 5,182,655 A | * | 1/1993 | Motoyanagi ................. 358/406 |
| 5,444,378 A | * | 8/1995 | Rogers ......................... 324/428 |
| 5,627,587 A | | 5/1997 | Murata et al. |
| 5,712,795 A | * | 1/1998 | Layman et al. .............. 700/297 |
| 5,714,994 A | * | 2/1998 | Suzuki et al. ................ 347/190 |
| 5,875,034 A | * | 2/1999 | Shintani et al. ............. 358/296 |
| 6,067,171 A | | 5/2000 | Yamada et al. |
| 6,144,725 A | * | 11/2000 | Kurosawa et al. ...... 379/100.05 |

(Continued)

FOREIGN PATENT DOCUMENTS

EP 0 820 184 1/1998

(Continued)

OTHER PUBLICATIONS

Patent Abstracts of Japan, vol. 1997, No. 09, Sep. 30, 1997, & JP 09 135315 A (Brother Ind Ltd).

(Continued)

*Primary Examiner*—Ngoc Yen Vu
*Assistant Examiner*—Brian Jelinek
(74) *Attorney, Agent, or Firm*—Frommer Lawrence & Haug LLP; William S. Frommer; Thomas F. Presson

(57) ABSTRACT

A stable condition for a printing operation regarding an apparatus having a printer unit and a battery unit, eliminating problems related to lack of a battery power during the printing operation performed by the battery, specifically for a portable apparatus using the battery, is obtained by an apparatus having the printer unit in which the printing operation is performed by processing data inputted from outside an embodiment thereof and/or data stored therein, in which the apparatus having the printer unit can be activated by the battery and perform communication with the battery so that, based on received information related to the remaining power of the battery as well as calculating the printing enabling power based on, for example, temperatures outside and/or inside the apparatus and the amount of data to be printed out, the remaining power of the battery is compared with the printing enabling power and, if the remaining power of the battery is lower than the printing enabling power, then a condition of inability of execution of printing operation is established and informed to a user in order to restrain printing action.

6 Claims, 5 Drawing Sheets

U.S. PATENT DOCUMENTS

| | | | |
|---|---|---|---|
| 6,382,774 B1 * | 5/2002 | Izumi | 347/61 |
| 6,850,270 B1 * | 2/2005 | Suzuki | 348/207.2 |
| 2001/0008424 A1 * | 7/2001 | Higuchi et al. | 348/372 |
| 2005/0083410 A1 * | 4/2005 | Higuchi et al. | 348/207.99 |

FOREIGN PATENT DOCUMENTS

| | | |
|---|---|---|
| GB | 2 138 190 A * | 10/1984 |
| JP | 09 139707 | 5/1997 |

OTHER PUBLICATIONS

Patent Abstracts of Japan, vol. 1997, No. 10, Jun. 6, 1997 & JP 09 149180 A (Brother Ind Ltd).

Patent Abstracts of Japan, vol. 1998, No. 06, Apr. 30, 1998 & JP 10 056604 A (Olympus Optical Co Ltd), Feb. 24, 1998.

Patent Abstracts of Japan, Publication No. 11-095956, Publication Date Apr. 9, 1999.

* cited by examiner

CHANGE IN PRINTING ENABLING
POWER ACCORDING TO TEMPERATURE

CHANGE IN BATTERY LEVEL
ACCORDING TO TEMPERATURE

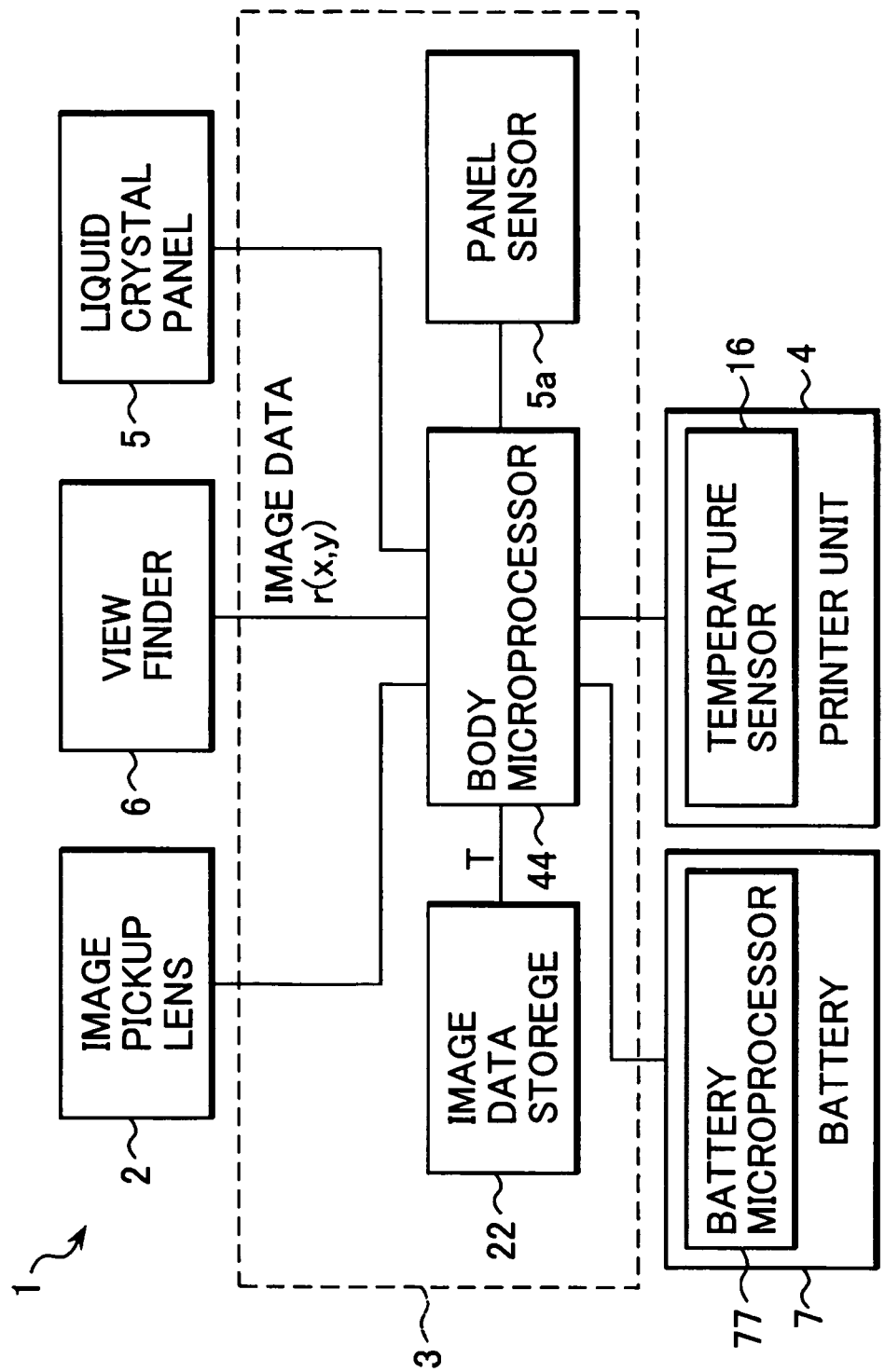

INTEGRATED IMAGING AND PRINTING APPARATUS

BACKGROUND OF THE INVENTION

1. Field of the Invention

The present invention relates to a technology for application in an apparatus having a printer unit, in which a stable condition for printing operation can be realized by eliminating an inconvenience of lack of power when executing the printing operation using a battery.

2. Description of the Related Art

For an apparatus having a printer unit, and especially for a portable apparatus, a battery supplies power for each part or portion of the apparatus including the printer unit itself. For example, a printing operation is performed by the power supplied by the battery.

The printing operation performed by the printer unit generally requires a large amount of power, so that it requires a means of restraining the printing operation if the actual remaining power of the battery is lower than the amount of power required for enabling the thorough execution of the printing operation. As the means of restraining the printing operation, there is for example a way in which a voltage of the battery is monitored so that the printing operation is halted when the voltage becomes lower than a specified threshold value.

However, the method mentioned above of restraining the printing operation by monitoring the battery voltage has a problem that the printing operation is started if the voltage level is at the threshold value or higher, even when the battery does not have power enough to complete the printing operation. In such case, the printing operation is halted at the time the battery voltage becomes lower than the threshold voltage with the printing operation already started, thus causing a waste of printing paper.

SUMMARY OF THE INVENTION

It is an object of the present invention to provide a solution to problems related to a lack of battery power during the printing operation as explained above, and to realize a stable condition for the printing operation.

In order to solve the problems mentioned above, according to the present invention, information related to a remaining power of a battery is collected by establishing a communication with the battery as well as calculating a printing enabling power based on information regarding such as temperatures outside and/or inside the apparatus and/or the amount of data to be printed out, etc. Then, the remaining power of the battery is compared with the printing enabling power and, if the remaining power is lower than the printing enabling power, then a condition of inability to execute the printing operation is established and then informed to a user in order to restrain printing action.

Thus, from the procedure described above, the problems caused by the lack of battery power during the printing operation executed by a printing unit can be solved.

The present invention includes an apparatus having the printing unit integrated in a body, that has a means such as a built-in microprocessor for processing printing data originated from, for example, inputted data from outside and/or data stored inside, and also includes a battery integrated to the body. Such apparatus performs communication with the battery and, based on received information related to the remaining power of the battery as well as calculating the printing enabling power based on information regarding for example temperatures outside and/or inside the apparatus and the amount of data to be printed out, the remaining power of the battery is compared with the printing enabling power and, if the remaining power is lower than the enabling power, then a condition of inability of execution of the printing operation (herein after referred to simply as "condition of inability of printing") is established and informed to a user in order to restrain printing action.

There are many alternative ways of restraining printing operation for the apparatus having a printing unit according to the present invention, such as one in which, when the condition of inability of printing is determined, a warning display or the like informs a user in order to restrain printing action due to the condition of inability of printing. By doing so, a loss of resources such as waste of printing paper can be avoided and, consequently, a stable condition for printing can be realized.

Alternatively, the apparatus having a printing unit according to the present invention can be set so that, when the condition of inability of printing is determined, the printing operation is immediately restrained, thus avoiding a waste of resources like the printing paper and, consequently, realizing a stable environment for printing. There is still a possibility of providing, at the same time, in addition to the restraining of the printing operation, the warning of the condition of inability of printing such as a message display, so that a user can restrain printing action.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 6 is a block diagram showing a control portion for the printing operation according to a preferred embodiment of the present invention.

DESCRIPTION OF THE PREFERRED EMBODIMENTS

A detailed description of an apparatus having a printing unit according to a preferred embodiment the present invention is made with reference to the drawings mentioned above, as follows. The preferred embodiment hereof is an application of the present invention to a video tape recorder (VTR) integrated to a camera (herein after referred to as "camcorder") having a printing apparatus incorporated to a same body.

Figure 1:
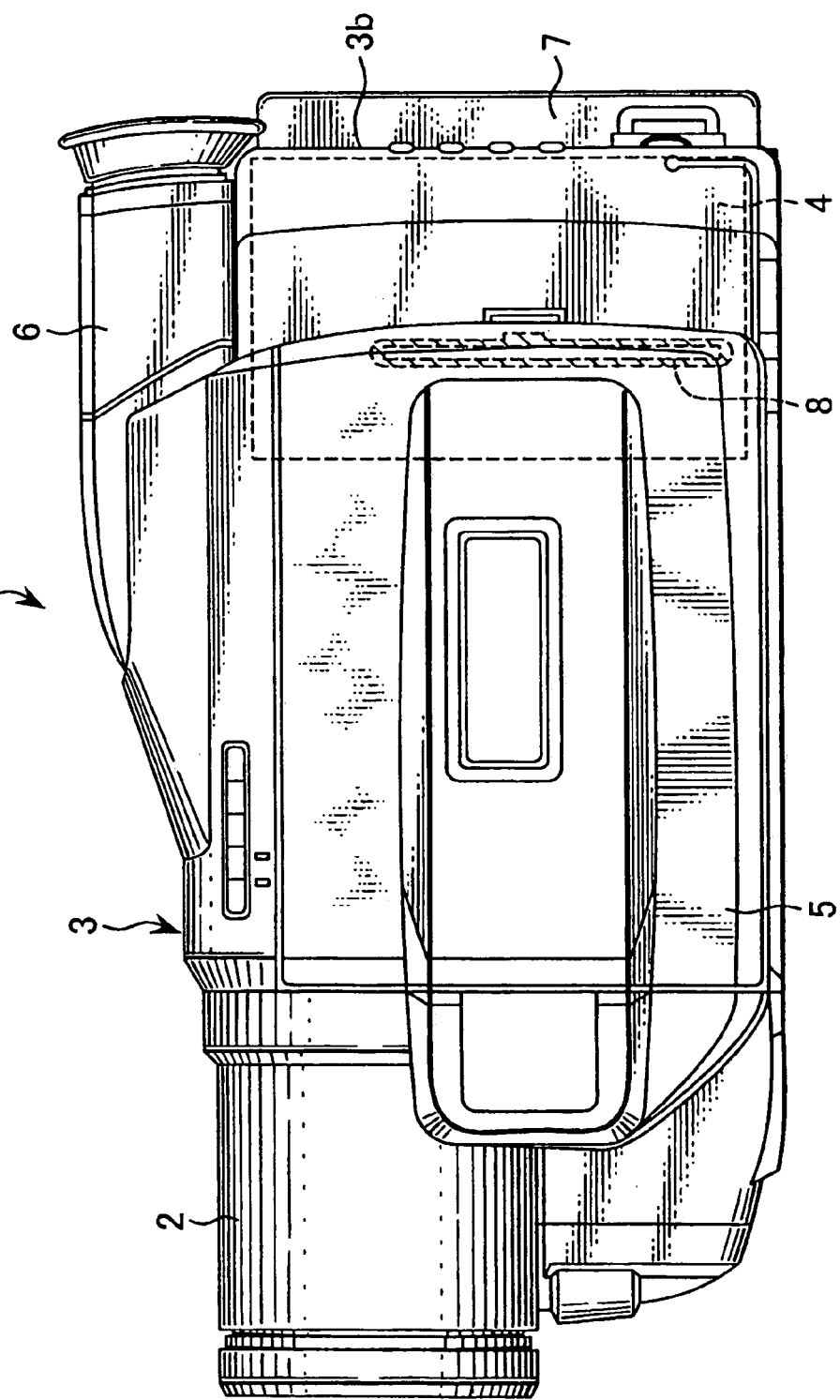
FIG. 1 is a side elevation showing an overall structure of a video tape recorder integrated to a camera as a description of a preferred embodiment of the present invention applied to a video tape recorder integrated to a camera having a printer unit integrated to one body.
Figure 2:
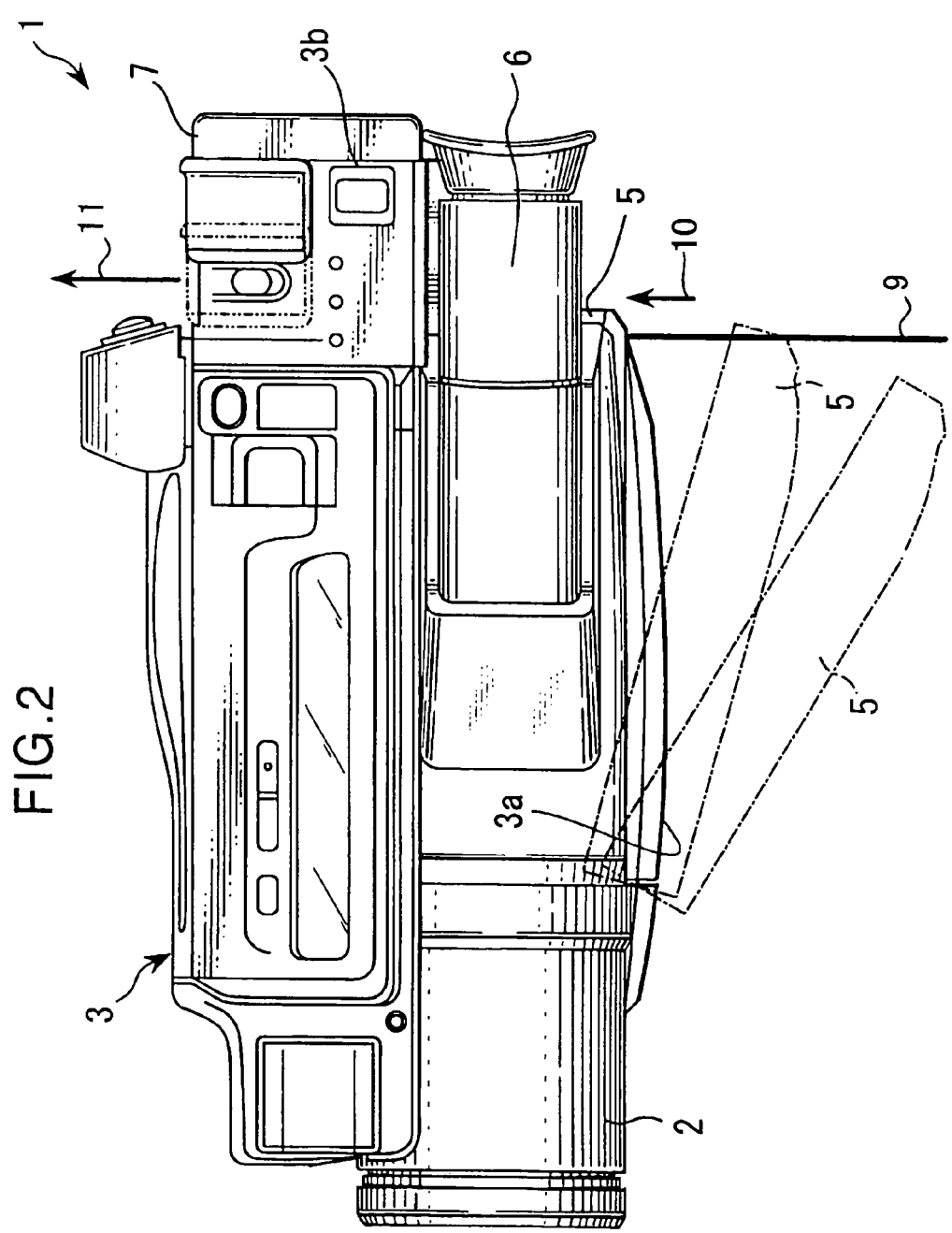
FIG. 2 is a plan showing an upper view of a video tape recorder integrated to a camera according to a preferred embodiment of the present invention.

FIG. 1 and FIG. 2 show an external appearance of a camcorder 1 having a printer unit incorporated to a same body.

The camcorder 1 has a main body 3 incorporating an image pickup lens 2, a VTR apparatus, etc., in which the main body 3 has a printing apparatus (herein after referred to as "printer unit") 4 integrated therewith. In addition, an image displaying portion (herein after referred to as "liquid crystal panel") 5 having a free open-close feature and a viewfinder 6 are attached respectively in a left side 3a and on a top of the main body 3. When in use, the liquid crystal panel 5 is open as shown in FIG. 2 and, when not in use, the liquid crystal panel 5 is closed as shown in FIG. 1.

Moreover, the liquid crystal panel 5 and the viewfinder 6 are used for displaying images to be selected and confirmed for printing, as well as a status of a printing operation by the printer unit 4, other than for confirmation of pictures during shooting, verification of the images taken or the like. Furthermore, on a rear side 3b of the main body 3, a battery 7 is attached in order to supply electric power to each part of the camcorder 1 including the printer unit 4, during its use as a portable apparatus.

As explained afterwards, the camcorder 1 constantly grasps information related to a condition of the battery 7 so as to allowing decision-making over the execution or not of the printing operation by the printer unit 4.

Figure 5:
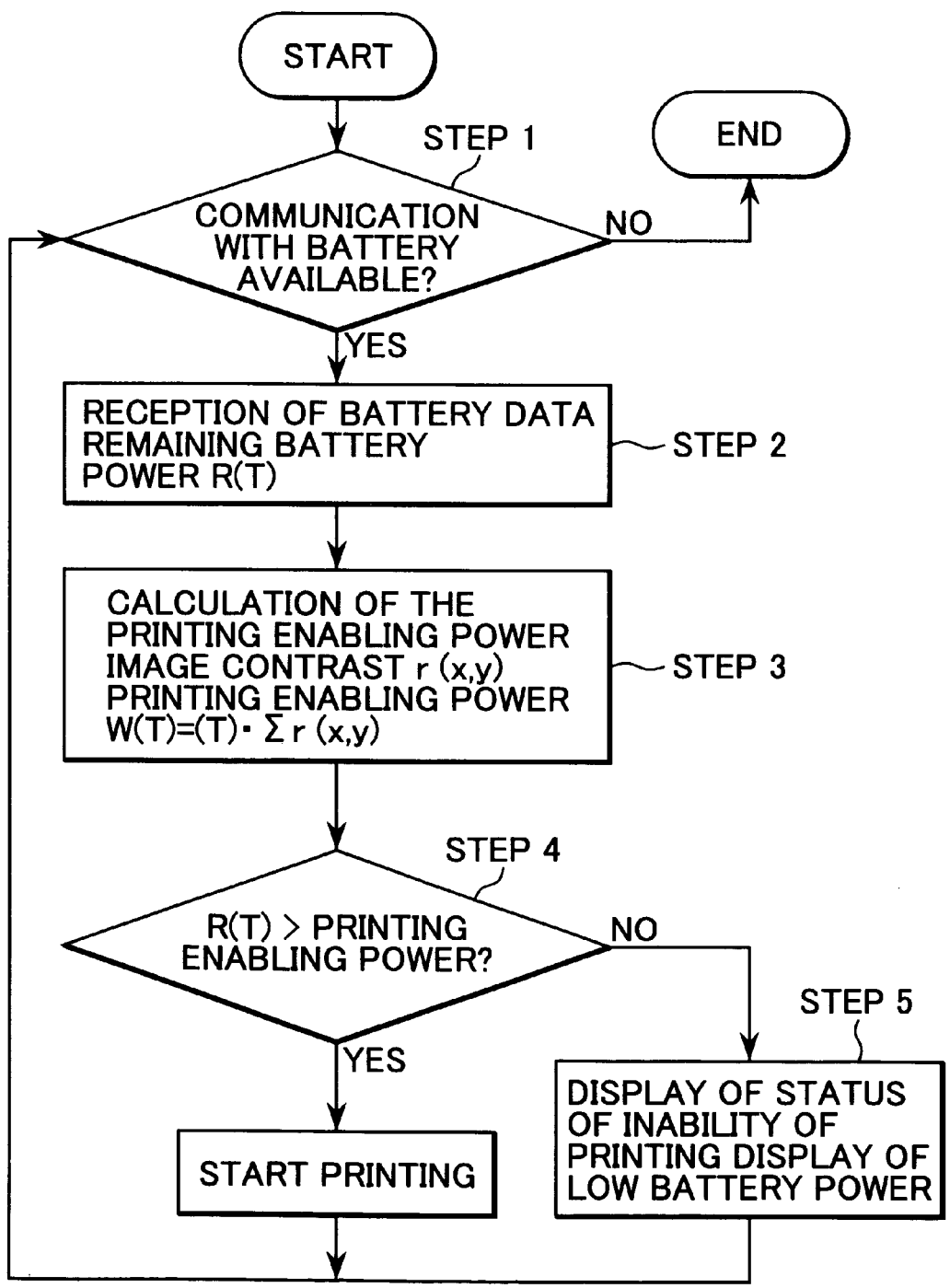
FIG. 5 is a flowchart showing a process flow according to a preferred embodiment of the present invention.

In other words, as shown in a flowchart in FIG. 5, the battery 7 has a built-in microprocessor, shown in FIG. 6 as a battery microprocessor 77, that constantly monitors and allows grasping of information like those related to a remaining power of a battery (an actual battery level) R(T). In addition, after determining whether communication between the main body 3 and the battery 7 is possible (Step 1), the information R(T) on the remaining power of battery 7 is sent according to demand to a built-in microprocessor at the main body (3) side (Step 2), and utilized for the process described below.

Likewise, at a side of main body portion 3, another built-in microprocessor allows the grasping of data to be printed out, that is, every information regarding image data of the camcorder 1, such as information on image contrast r(x,y), external and/or internal temperature (hereinafter referred to simply as "temperature") or the like. As an example, a temperature sensor 16 built in the printer unit 4 in FIG. 6 grasps the temperature for the process described below.

The built-in microprocessors described above related to the body of the camcorder 1 are represented in FIG. 6 as body microprocessor 44 in which data such as the data required for the process described herein, like the remaining battery power R(T), information on image contrast r(x,y) and temperature T, and commands for controlling the printing operation, displaying of image data or the like. The body microprocessor 44 is also responsible for controlling the printing operation by sending commands for example to the printer unit 4, the liquid crystal panel 5 and the viewfinder 6.

In fact, body microprocessor 44 represents a processing device or a plurality of processing devices that may include the microprocessors described above having, for example, a function of processing the battery data, the image data, the temperature data or the like such as in the processing and calculations described below.

Further, when applicable, numbers in FIG. 6 are set in order to correspond to numbers of portions of the preferred embodiment according to FIG. 1 and FIG. 2.

Figure 3:
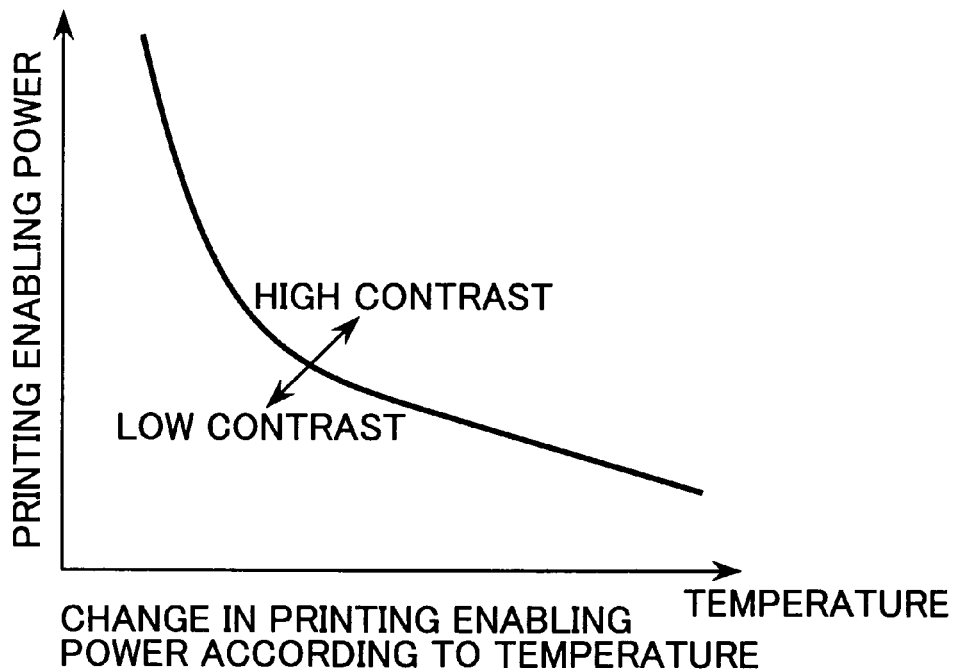
FIG. 3 is graph showing a change of a printing enabling power according to temperature.

A relation between the temperature and a power required for printing W(T), as shown in FIG. 3, shows that a required printing enabling power decreases with increasing temperature. Moreover, if using a power that is equal to the power required for printing W(T) or higher, it is possible to increase a contrast of a printing image.

Figure 4:
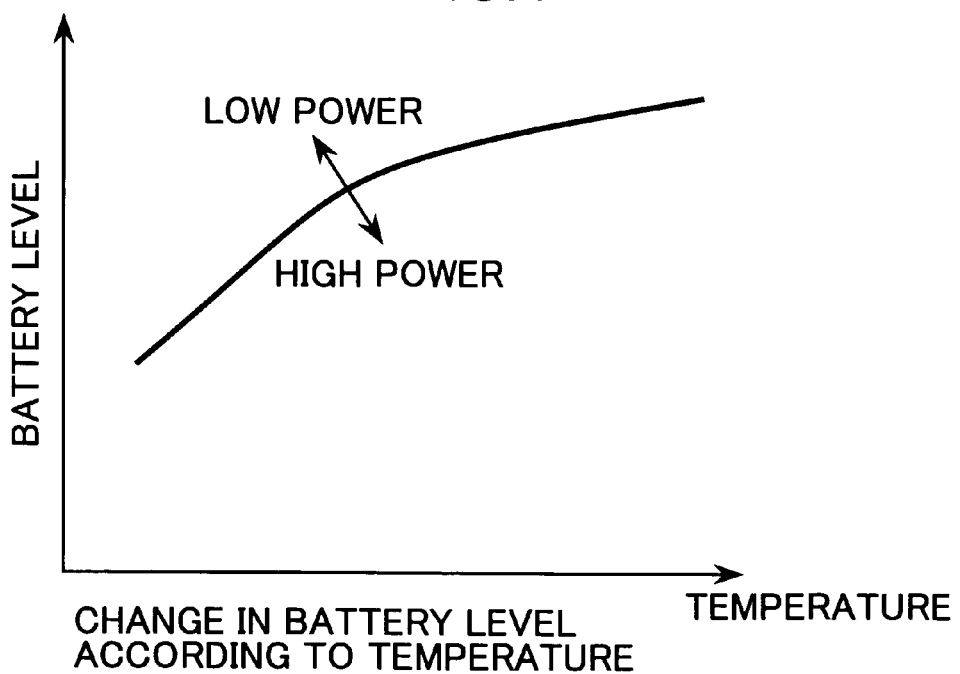
FIG. 4 is graph showing a change of a battery power level according to temperature.

On the other hand, a relation between a battery level of battery 7 and the temperature, as shown in FIG. 4, shows that the level of the battery 7, that is, the capacity of the battery 7 of supplying power, apparently increases with increasing temperature.

However, the power required for printing W(T) for printing a desired image data can be calculated from conditions like the temperature and the image contrast mentioned above, through the function described below:

$$W(t)=f(T, t) \times r(x, y)$$

Furthermore, f(T, t) is a function of temperature T that increases with decreasing temperature so that a larger amount of power is required, and r(x, y) is an image contrast regarding a point (x, y) of the image. In a case of a so-called heat fusion type printing in which ink is fixed on the printing paper through melting by means of heat, the required power involves the contrast mentioned above. As already mentioned, the relation between the level of battery 7 and the temperature, as shown in FIG. 4, shows that the level of the battery 7, that is, the capacity of the battery 7 of supplying power apparently increases with increasing temperature.

Moreover, as the printing operation requires a certain period of time to be performed, a value obtained by integration of the time (dt) required for printing one sheet of paper, i.e., ∫W (t) dt, becomes the printing enabling power for one sheet of paper.

If the temperature during printing is constant, the value can be simplified to $$\text{PRINTING ENABLING POWER}=f'(T) \times \Sigma r(x, y).$$

After calculating the printing enabling power for one sheet of paper within the camcorder as described above, the printing enabling power is compared against a remaining power obtained through communication with the battery 7 (Step 4). In other words, the remaining power R(T) is the information regarding the remaining power available for consumption in the battery 7 at actual time. As a consequence, by comparing the printing enabling power with the remaining power of the battery 7, it can be determined whether the printing operation can be completed with the remaining power R(T).

In addition, regarding the camcorder 1, although the printer unit 4 is started if it is determined that printing is possible, an appropriate warning indication (for example, indication of a lack of battery power or indication of a remaining battery power) is done in the liquid crystal panel 5, the view finder 6 or the like, so that attention of a user is called, and judgment on later procedures is entrusted to the user (Step 5) or, printing is restrained, warning is performed (for example, a display indication of inability of printing) is done in the liquid crystal panel 5, the view finder 6 or the like so that the printing operation is restrained beforehand, or the printing operation is forcibly halted.

Furthermore, a paper-supplying aperture 8 of the printer unit 4 is covered when the liquid crystal panel 5 is closed. Hence, according to the upper elevation of the camcorder 1 as shown in FIG. 2, a printing paper 9 is drawn from the paper-supplying aperture 8 into a printer unit 4 in the direction shown by arrow 10, so that the printing paper is ejected after printing through a printout ejection aperture, not shown in the figure, in the direction of arrow 11.

Still, for the camcorder 1, since the printing operation is not performed at least as far as the paper supplying aperture 7 set in the main body 3 is not in an exposed mode with the liquid crystal panel 5 open, it is not necessary to keep the power of the printer unit 4 turned constantly ON. Accordingly, regarding the camcorder 1, the power of the printer unit 4 is set so as to either have an on-off switch in the left side 3*a* of the main body 3 which is the portion that is covered by the liquid crystal panel 5 when the panel is closed, in a similar way to the paper supplying aperture 8, or interlocked with the open-close of the liquid crystal panel 5 in order to have the power of the printer unit 4 automatically turned on (turn ON) when the liquid crystal panel 5 is open and automatically turned off (turn OFF) when the liquid crystal panel 5 is closed. Such on-off state of the liquid crystal panel 5 may be detected by a panel sensor 5*a* of FIG. 6 comprising an optical, a mechanical, an electrical sensor device or the like.

In addition, data subject to be printed out by the printer unit 4 such as image data include input images from outside captured by the image pickup lens 2 as well as data like images and pictures stored in an image data storage 22 according to FIG. 6 such as video tapes, integrated memories, freely removable memories, etc.

Moreover, as for the camcorder 1 that comprises an apparatus having a printer unit, at a stage previous to printing of data like image data by means of the printer unit 4, the remaining power R(T) of the battery 7 is detected and, after compared to the printing enabling power required for the data mentioned above, as the printing operation is done only when the remaining power R(T) is equal to the printing enabling power or higher, it is possible to avoid the problem of interruption of the printing operation due to lack of power of the battery 7 as well as a waste of printing paper. In addition, information like those related to the remaining power of the battery are informed to the camcorder's user, thus providing a printing opportunity in a planned fashion and permitting the realization of a stable printing environment.

Finally, the configurations and structures of respective units and portions described specifically with respect to the preferred embodiments hereof are only one example of a realization of the invention, so the embodiments thereof should not be construed as to limit the technical scope of the present invention.

What is claimed is:

1. An apparatus for recording and printing an image comprising:
    a camera means for recording data, said data representing one or more images;
    a printer means for printing a selected image from the one or more images;
    a battery unit having a battery for powering the apparatus; and
    a power determining means for receiving information from said battery relating to the remaining power in said battery, calculating the amount of power necessary for performing a printing operation by said printer means, comparing the remaining power and the power necessary for said printing operation, and alerting a user when the remaining power in said battery is less than the power necessary for performing said printing operation,
    wherein said camera means, said printer means, said battery unit, and said power determining means are arranged within a common housing; and
    wherein said amount of power necessary for performing a printing operation is calculated based on external and internal temperatures of the apparatus, and an amount of data to be printed out.

2. The apparatus according to claim 1 wherein upon determination that the remaining power is less than the power necessary for performing said printing operation, a warning action is performed.

3. The apparatus according to claim 1 wherein upon determination that the remaining power is less than the power necessary for performing said printing operation, a warning action is performed and the printing operation is restrained.

4. The apparatus according to claim 1 wherein upon determination that the remaining power is less than the power necessary for performing said printing operation, the printing operation is restrained.

5. The apparatus according to claim 1 wherein upon determination that the remaining power is less than the power necessary for performing said printing, the printing operation is restrained and a message is provided in order to notify the user.

6. A method of controlling a printing operation in an apparatus, said method comprising the steps of:
    receiving information related to power remaining in a battery of a battery unit;
    ascertaining the external and internal temperatures of the apparatus;
    calculating a power level required for a printing operation of a printer unit, wherein the power level required is calculated based on external and internal temperatures of the apparatus;
    comparing the remaining power in the battery with the power level required for the printing operation; and
    informing a user that the printing operation cannot be performed when the remaining power of the battery is less than the power level required for performing the printing operation,
    wherein the apparatus includes a camera means for recording data representing one or more images to be printed in the printing operation, and
    wherein the camera means, the printing unit, and the battery unit are arranged within a common housing.

* * * * *